(12) United States Patent
Hohmann et al.

(10) Patent No.: US 12,487,481 B2
(45) Date of Patent: Dec. 2, 2025

(54) DISPLAY ELEMENT HAVING CAMOUFLAGE TECHNOLOGY

(71) Applicant: Continental Automotive Technologies GmbH, Hannover (DE)

(72) Inventors: Kai Hohmann, Babenhausen (DE); Jürgen Bäthis, Wetzlar (DE); Andreas Brüninghaus, Wiehl (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/693,087

(22) PCT Filed: Sep. 15, 2022

(86) PCT No.: PCT/DE2022/200218
§ 371 (c)(1),
(2) Date: Mar. 18, 2024

(87) PCT Pub. No.: WO2023/041129
PCT Pub. Date: Mar. 23, 2023

(65) Prior Publication Data
US 2025/0130454 A1  Apr. 24, 2025

(30) Foreign Application Priority Data
Sep. 20, 2021  (DE) ............. 10 2021 210 404.5

(51) Int. Cl.
*G02F 1/1333*  (2006.01)
(52) U.S. Cl.
CPC .. *G02F 1/133325* (2021.01); *G02F 1/133314* (2021.01)

(58) Field of Classification Search
CPC ............. G02F 1/133325; G02F 1/133314
USPC ......................................... 349/56
See application file for complete search history.

(56) References Cited

U.S. PATENT DOCUMENTS

| | | | |
|---|---|---|---|
| 2009/0092895 | A1 | 4/2009 | Yoo |
| 2012/0139956 | A1 | 6/2012 | Joseph et al. |
| 2015/0036061 | A1 | 2/2015 | Chen |
| 2017/0139543 | A1 | 5/2017 | Lin et al. |

(Continued)

FOREIGN PATENT DOCUMENTS

| | | |
|---|---|---|
| DE | 102016114272 A1 | 2/2018 |
| DE | 102017000159 A1 | 7/2018 |

(Continued)

OTHER PUBLICATIONS

Office Action issued on Oct. 22, 2024 from corresponding Korean patent application No. 10-2024-7005997.

(Continued)

*Primary Examiner* — Christopher M Raabe
(74) *Attorney, Agent, or Firm* — COZEN O'CONNOR

(57) ABSTRACT

The present disclosure relates to a display element with disappearance technology and to a method for producing such a display element. The display element has a display assembly with a display panel and a backlight arranged behind the display panel. The display element also has a stabilization assembly with a cutout for accommodating the display assembly, and a decorative film, which is attached at least to a top side of the stabilization assembly and extends over the cutout for the display assembly.

11 Claims, 4 Drawing Sheets

(56) References Cited

U.S. PATENT DOCUMENTS

| | | | |
|---|---|---|---|
| 2018/0037174 | A1 | 2/2018 | Seegers et al. |
| 2018/0201135 | A1 | 7/2018 | Brandt et al. |
| 2019/0001637 | A1 | 1/2019 | Ito et al. |
| 2020/0241363 | A1 | 7/2020 | Ma et al. |
| 2021/0178733 | A1 | 6/2021 | Yamanaka et al. |
| 2022/0404530 | A1 | 12/2022 | Araya et al. |
| 2024/0377674 | A1* | 11/2024 | Hohmann ......... G02F 1/133562 |

FOREIGN PATENT DOCUMENTS

| | | |
|---|---|---|
| EP | 3218766 B1 | 5/2020 |
| JP | 2008216939 A | 9/2008 |
| JP | 2009096380 A | 5/2009 |
| JP | 2012118513 | 6/2012 |
| JP | 2018005698 A | 1/2018 |
| KR | 20070100040 A | 10/2007 |
| KR | 100859658 | 9/2008 |
| KR | 20150015339 A | 2/2015 |
| KR | 20180036336 A | 4/2018 |
| KR | 20180111456 | 10/2018 |
| WO | 2021085524 A1 | 5/2021 |

OTHER PUBLICATIONS

Office Action issued on Oct. 25, 2024 from related Korean patent application No. 10-2024-7005998.
Office Action dated Mar. 22, 2022 from related German patent application No. 10 2021 210 408.8.
International Search Report and Written Opinion dated Nov. 29, 2022 from related International Patent application No. PCT/DE2022/200217.
Office Action dated Mar. 16, 2022 from corresponding German patent application No. 10 2021 210 404.5.
International Search Report and Written Opinion dated Dec. 21, 2022 from corresponding International Patent application No. PCT/DE2022/200218.
Non-Final Office Action mailed Mar. 27, 2025 from related U.S. Appl. No. 18/693,057.
Office Action of Korean Patent Application No. KR 10-2024-7005998, dated May 26, 2025.
Notice of Allowance of Korean Patent Application No. KR 10-2024-7005997, dated Jul. 30, 2025.

* cited by examiner

DISPLAY ELEMENT HAVING CAMOUFLAGE TECHNOLOGY

CROSS REFERENCE TO RELATED APPLICATIONS

This US patent application claims the benefit of PCT patent application No. PCT/DE2022/200218, filed Sep. 15, 2022, which claims the benefit of German patent application No. 10 2021 210 404.5, filed Sep. 20, 2021, both of which are hereby incorporated by reference.

TECHNICAL FIELD

The present disclosure relates to a display element with disappearance technology and to a method for producing such a display element.

BACKGROUND

Non-self-luminous transmissive display elements such as LCDs (liquid crystal displays) require a backlight for image representation. The task of the backlight is here to illuminate the display element as uniformly as possible over the entire active surface in order to produce a display that is as homogeneous as possible right up to the peripheral region. A display that is as bright as possible is achieved due to the fact that the alignment of a liquid crystal layer of the display element in combination with the alignment of polarizing filters permits maximum transmission. A dark or black display content, e.g. in the peripheral region, is achieved by way of minimal transmission, which, in contrast to self-luminous displays, is here always greater than zero.

In the automotive sector, but also in household appliances and in other areas of application, there is an observable trend that operating or display functions should be as invisible as possible in the switched-off state in order to achieve a reduced design with smooth, generous surfaces. Technical elements should be visible only when they are needed. Such disappearance technologies are known, for example, under the names "Shytech" or "Camouflage".

To realize disappearance technology, for example, a display element may be arranged behind a design surface. Suitable transmissive, decorative surfaces for this application may be made in real material, e.g. wood, stone, leather, imitation leather, etc., and may also be manufactured in plastic or glass technology. The decoration is applied by means of printing technology onto the surface of a cover panel or alternatively onto a separate sheet surface. The decoration may be applied, for example, as a transmissive print or in the form of an aperture mask.

In this context, US 2015/0036061 A1 describes a display apparatus with a decorative layer, which is formed at least in part of a viewing region. When a display module of the display apparatus is in operation and emits light through the decorative layer, the decorative layer appears transparent. When the display module is not in operation, the decorative layer is irradiated by ambient light, and a decorative pattern of the decorative layer is visible.

WO 2021/085524 A1 describes a display apparatus for being attached to an object. The display apparatus comprises a display unit with a display surface for displaying video data, a translucent decorative layer, which is arranged on the side of the display surface and provides a decorative design that harmonizes with the external appearance of the object, and a translucent one-way mirror layer arranged between the display unit and the decorative layer.

When implementing the disappearance technology, a high-quality resolution of the display through the structure of the decoration should be achieved. In practice, however, the influence of a large number of parameters leads to impairments in image quality. In this regard, the surface properties of the decoration, the use of a surface panel made of plastic, which supports the decoration and requires a certain mechanical distance from the image-generating display surface, the mechanical stability of the surface or of the surface cover glass, and the assembly process of the display in relation to the surface may be mentioned. If necessary, a transparent touch sensor may also need to be integrated, which may likewise result in a degradation in image quality.

A further complicating point for an authentic material representation is that the decoration should be executed on the topmost surface facing the viewer in order to create a visually and haptically authentic overall experience.

In summary, displays with disappearance technology are considerably more difficult to design in terms of image quality and appearance than standard displays.

SUMMARY

One important aspect in the realization of displays with disappearance technology with a high-quality image display is that the distance between the light exit from the display panel and the surface of the decoration is kept as small as possible.

It is an object of the disclosure to provide a display element with disappearance technology which combines a high-quality image display with a high mechanical stability.

This object is achieved by a display element having the features of the claims and by a method of the claims for producing a display element. The dependent claims relate to configurations of the disclosure.

According to a first aspect of the disclosure, a display element has a display assembly with a display panel and a backlight arranged behind the display panel; a stabilization assembly with a cutout for accommodating the display assembly; and a decorative film, which is attached at least to a top side of the stabilization assembly and extends over the cutout for the display assembly, wherein the stabilization assembly mechanically stabilizes the decorative film.

The solution according to the disclosure makes it possible to minimize the distance of the display from the decorative surface. By the solution according to the disclosure, a display surface may thus be inserted into a larger decorative panel while ensuring a high image quality and a great mechanical stability of the entire assembly.

In the solution according to the disclosure, a special stabilization assembly is used to mechanically stabilize the decorative film. Only the decorative film is disposed in the region of the display surface and not any supporting components. This allows the distance of the display from the decorative surface to be minimized. By the solution according to the disclosure, a display surface may thus be inserted into a larger decorative panel while ensuring a high image quality and a great mechanical stability of the entire assembly. At the same time, a continuous decorative surface may be achieved. A decorative display insert in a passe-partout of a decorative trim panel will always have a bothersome surrounding periphery. In addition, the decorative design of such an insert will not be able to be kept uniform or only with great difficulty, i.e. in addition to surrounding peripheries, bothersome discontinuities in the transitions from the display region to the trim region will also be visible. Neither occurs in the solution according to the disclosure, since a continuous decorative film is used, which may extend over the entire component in which the display element is installed.

According to one aspect of the disclosure, the decorative film is attached to the top side of the stabilization assembly by adhesive bonding, pressing or hot stamping. The method of attaching or applying the decorative film onto the stabilization assembly used is at the discretion of the person skilled in the art. All the methods listed are well suited for this purpose. In addition, they may also be used in the case of curved surfaces or free-form surfaces. For this purpose, the decorative film may initially be deformed, for example by deep drawing. The shaped decorative film may then be applied onto the stabilization assembly by adhesive bonding, pressing or hot stamping.

According to one aspect of the disclosure, a thickness of the decorative film is greater than 200 µm, preferably greater than 500 µm. The decorative film must also have sufficient stability in the display region. This stability may be achieved not only by the choice of the material of the decorative film, but in particular also by the thickness of the decorative film.

According to one aspect of the disclosure, a thickness of the decorative film in a display region located above the display assembly is thinner than in a peripheral region extending around the display assembly. This allows for further optimization of the image sharpness.

According to one aspect of the disclosure, the decorative film consists of two or more sheets. If the decorative film is not available in a sufficient thickness, a laminate of two or more sheets may also be used, for example, to achieve the necessary stability. A first sheet serves as a carrier sheet, a second sheet serves as a decorative sheet.

According to one aspect of the disclosure, the stabilization assembly is applied onto the decorative film by plastic injection molding. As an alternative to applying the decorative film onto the stabilization assembly, the decorative film may also be processed in a plastic injection molding process, e.g. as a sheet inserted and back-molded into a plastics tool. This is done in such a way that the plastics material crucially supports the region of the decorative film outside the display surface and the region of the display surface is left free or minimized. The plastic injection molding outside the display surface is thus designed as a stabilizing element.

According to one aspect of the disclosure, the display assembly is adhesively bonded to the decorative film and/or the stabilization assembly. The display assembly placed into the cutout in the stabilization assembly is preferably adhesively bonded at least to the decorative film by an optical bonding layer. The use of an optically clear adhesive (OCA) film or a layer of a liquid optically clear adhesive (LOCA: liquid optical clear adhesive; OCR: optical clear resin) is preferred for this purpose. For better mechanical stabilization, the display assembly may also be adhesively bonded to the stabilization assembly so that the decorative film is not mechanically loaded by the weight of the display assembly.

According to one aspect of the disclosure, a distance between the display panel and the decorative film lies in the range from 500 µm to 1000 µm. With such a choice of the distance between the display surface and the decorative film, or strictly speaking between the light valves of the display panel and the decorative print of the decorative film, a very good image quality is achieved.

According to one aspect of the disclosure, the display element has two or more display assemblies. Accordingly, the stabilization assembly has two or more cutouts for accommodating the two or more display assemblies. The solution according to the disclosure also allows the realization of multi-displays. To this end, it is sufficient to use a plurality of display regions or cutouts for display assemblies.

According to the disclosure, only the decorative film is disposed in the region of the cutout but not any supporting components.

According to a further aspect of the disclosure, a method for producing a display element includes the steps of applying a decorative film onto a stabilization assembly, wherein the stabilization assembly mechanically stabilizes the decorative film; and placing at least a part of a display assembly into a cutout in the stabilization assembly.

In the method according to the disclosure, the desired decorative film is applied onto the stabilization assembly in order to mechanically stabilize the decorative film. At least a part of the display assembly, e.g. the backlight, or alternatively the entire display assembly is then placed into the corresponding cutout in the stabilization assembly. The display element according to the disclosure may be easily produced in this way.

According to one aspect of the disclosure, a display panel of the display assembly is applied onto a rear of the decorative film before the decorative film is applied onto the stabilization assembly. If not the entire display assembly is intended to be placed into the cutout in the stabilization assembly, the display panel may be initially laminated to the rear of the decorative film without the backlight. The resulting assembly is then mounted on the stabilization assembly. The backlight is then mounted against the display panel from the back.

According to one aspect of the disclosure, the display assembly is adhesively bonded to the decorative film and/or to the stabilization assembly. By adhesively bonding the display assembly to the decorative film, a stable overall structure and a constant distance between the surface of the display panel and the decorative film are achieved. The adhesive bonding may be effected, for example, with an optically clear adhesive film or a layer of a liquid optically clear adhesive. Adhesively bonding the display assembly to the stabilization assembly results in further mechanical stabilization, since the decorative film is not mechanically loaded by the weight of the display assembly.

A display element according to the disclosure is used to implement a display with disappearance technology, for example in a transport or in a household appliance. The decoration may be used to simulate, for example, a wood look, a carbon look or an appearance of a metallic surface.

BRIEF DESCRIPTION OF THE FIGURES

Further features of the present invention will become apparent from the following description and the appended claims in conjunction with the figures.

DETAILED DESCRIPTION

For a better understanding of the principles of the present disclosure, embodiments of the disclosure will be explained below in greater detail with reference to the figures. The same reference signs are used for identical or functionally equivalent elements in the figures and not necessarily described again for each figure. It goes without saying that the disclosure is not restricted to the embodiments illustrated and that the features described may also be combined or modified without departing from the scope of protection of the disclosure as defined in the appended claims.

Figure 1:
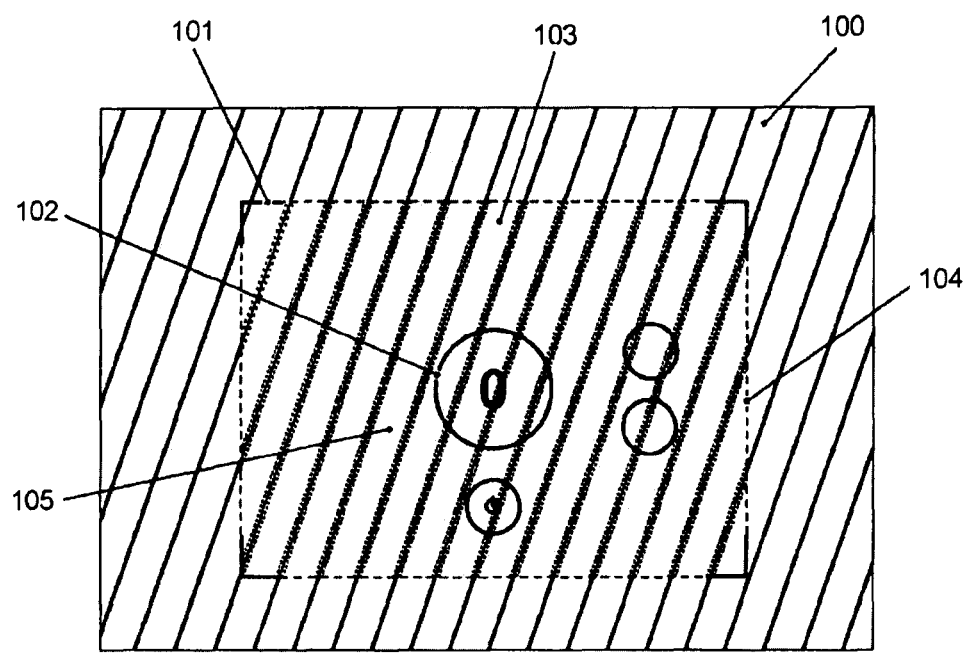
FIG. 1 schematically shows a display behind a decorative surface.

FIG. 1 schematically shows a display behind a decorative surface. It shows the effect of a known display element arranged behind a light-transmissive layer on a viewer. In the example shown, the light-transmissive layer is a decorative surface 100. The decorative design of the decorative surface 100 is indicated in FIG. 1 by hatching. The dimensions of the display element are indicated by corner elements 101. A plurality of symbols 102 are represented by the display element. Due to the properties of the decorative surface 100, of the display element and of the overall structure, the representation exhibits degradations in image quality, for example a high degree of diffusion. This is indicated in FIG. 1 by the dashed lines within the display region 103 that are drawn in addition to the hatching.

Figure 2:
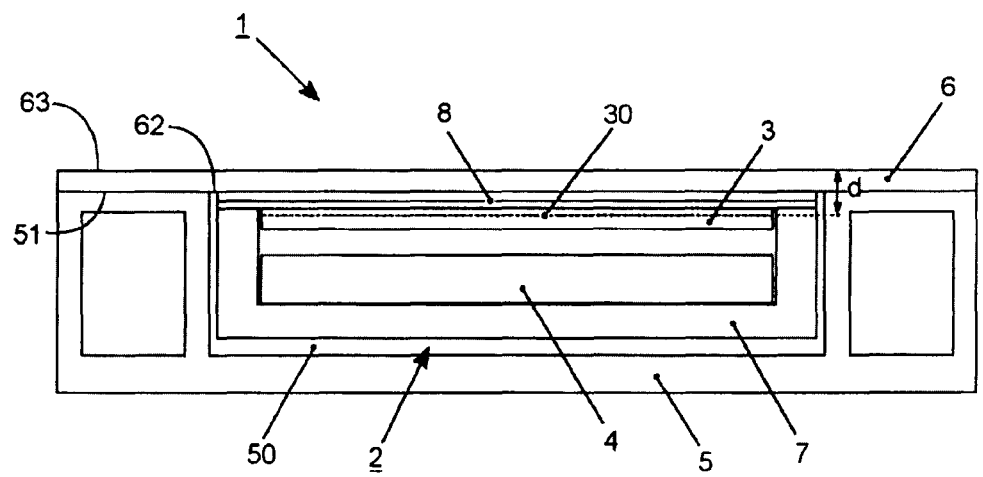
FIG. 2 schematically shows a first embodiment of a display element according to the disclosure.

FIG. 2 schematically shows a first embodiment of a display element 1 according to the disclosure. The display element 1 comprises a display assembly 2, a stabilization assembly 5, and a decorative film 6. In this example, the display assembly 2 comprises a display panel 3 and a backlight 4 arranged behind the display panel 3. The display panel 3 and the backlight 4 are arranged in a common housing 7. The stabilization assembly 5 has a cutout 50 for accommodating the display assembly 2. The decorative film 6 extends over the cutout 50 for the display assembly 2 and is attached at least to a top side 51 of the stabilization assembly 5. The decorative film 6 may be attached to the top side 51 of the stabilization assembly 5 for example by adhesive bonding, pressing or hot stamping. Alternatively, the stabilization assembly 5 may also be applied onto a rear side 62 of the decorative film 6 by plastic injection molding. The thickness of the decorative film 6 should be greater than 200 μm, preferably greater than 500 μm, so that the decorative film 6 also has sufficient stability in the display region. Here, a thickness of the decorative film 6 in a display region located above the display assembly 2 may be thinner than in a peripheral region extending around the display assembly 2. The display panel 3 here is an externally illuminated display panel 3, for example a liquid crystal display (LCD) panel, which has a multiplicity of light valves 30, which regulate the passage of light from the backlight 4 through the display panel 3. For example, the backlight 4 may be a matrix backlight. The distance d between the light valves 30 and a top side 63 of the decorative film 6 preferably lies in the range from 500 μm to 1000 μm. In this embodiment, the display assembly 2 is adhesively bonded to the decorative film 6 by an optical bonding layer 8. For the bonding layer 8, for example, an optically clear adhesive film or a layer of a liquid optically clear adhesive may be used. Alternatively, there may also be an air gap at this location.

Figure 3:
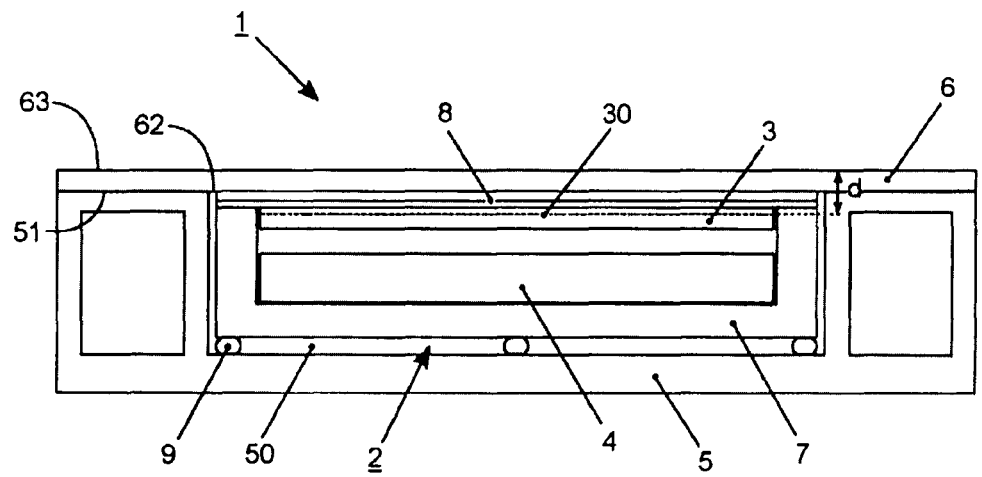
FIG. 3 schematically shows a second embodiment of a display element according to the disclosure.

FIG. 3 schematically shows a exemplary embodiment of a display element 1 according to the disclosure. It largely corresponds to the display element 1 shown in FIG. 2; however, the display assembly 2 in this embodiment is adhesively bonded to the stabilization assembly 5. For this purpose, there are adhesive bonds 9 between the housing 7 of the display assembly 2 and the stabilization assembly 5. The adhesive bonds 9 improve the mechanical stability, since the decorative film 6 is not mechanically loaded by the weight of the display assembly 2.

Figure 4:
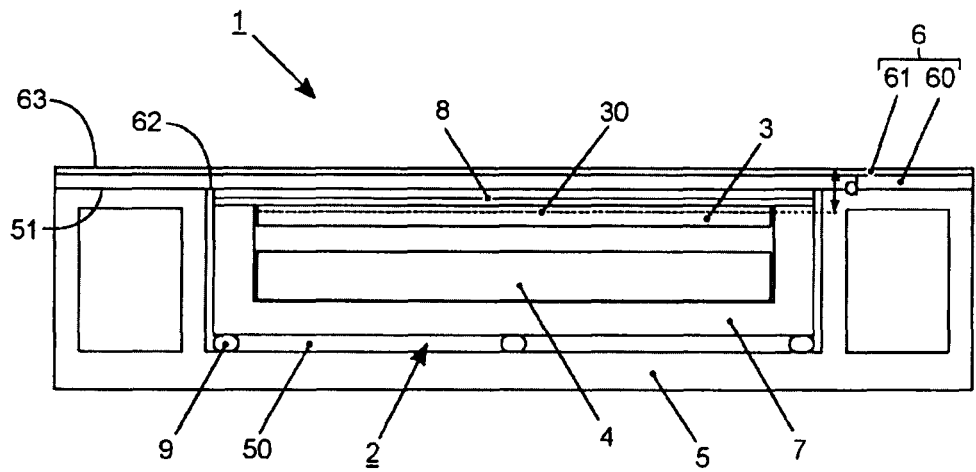
FIG. 4 schematically shows a third embodiment of a display element according to the disclosure.

FIG. 4 schematically shows a third embodiment of a display element 1 according to the disclosure. It largely corresponds to the display element 1 shown in FIG. 3; however, the decorative film 6 in this exemplary embodiment consists of a laminate of two sheets, namely a carrier sheet 60 and a decorative sheet 61. In this way, the necessary stability can be achieved even if the decorative film 6 is not available in a sufficient thickness.

Figure 5:
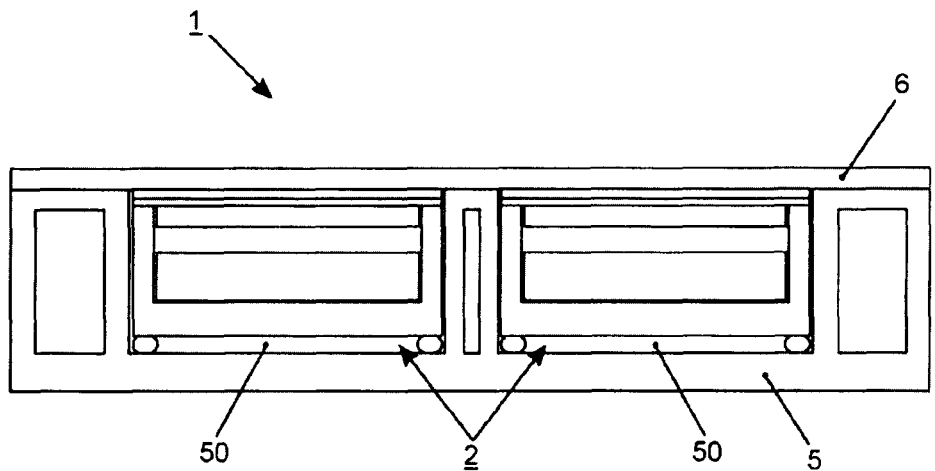
FIG. 5 schematically shows a display element according to the disclosure with a plurality of displays.

FIG. 5 schematically shows a display element 1 according to the disclosure with a plurality of displays. In this example, the display element 1 has two display assemblies 2. The stabilization assembly 5 accordingly has two cutouts 50 for accommodating the two display assemblies 2. For the realization of multi-displays, as shown in FIG. 5, a separate cutout 50 may be provided for each display assembly 2. Alternatively, a plurality of display assemblies 2 may also be placed into a common cutout 50.

Figure 6:
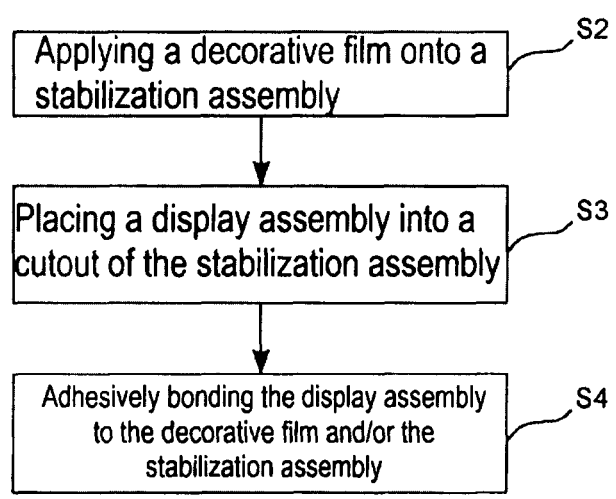
FIG. 6 schematically shows a first embodiment of a method for producing a display element according to the disclosure.

FIG. 6 schematically shows a first embodiment of a method for producing a display element according to the disclosure. In a first step, a decorative film is applied S2 onto a stabilization assembly. This may be done, for example, by adhesive bonding, pressing or hot stamping. Alternatively, the stabilization assembly may be applied onto the decorative film by plastic injection molding. Next, at least a part of a display assembly is placed S3 into a cutout in the stabilization assembly. Finally, the display assembly is optionally adhesively bonded S4 to the decorative film and/or the stabilization assembly. By adhesively bonding S4 the display assembly to the decorative film, a stable overall structure and a constant distance between the surface of the display panel and the decorative film are achieved. The adhesive bonding S4 may be effected, for example, with an optically clear adhesive film or a layer of a liquid optically clear adhesive. Adhesively bonding S4 the display assembly to the stabilization assembly results in further mechanical stabilization, since the decorative film is not mechanically loaded by the weight of the display assembly.

Figure 7:
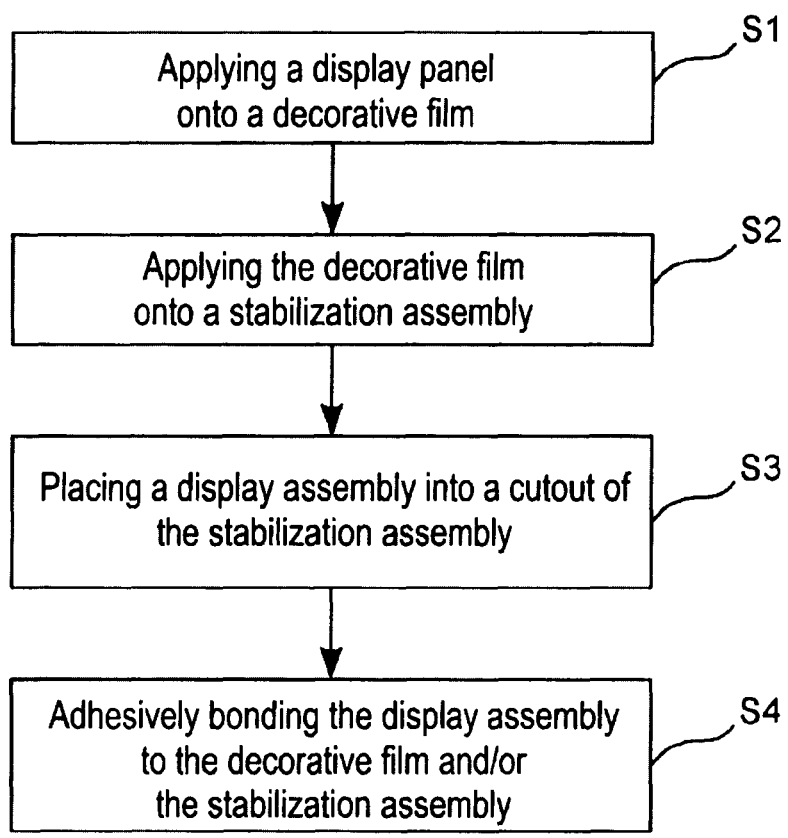
FIG. 7 schematically shows a second embodiment of a method for producing a display element according to the disclosure.

FIG. 7 schematically shows a second embodiment of a method for producing a display element according to the disclosure. In a first step, the display panel of the display assembly is applied S1 onto the rear side of the decorative film. The decorative film is then applied S2 onto the stabilization assembly. In a further step, the remaining part of the display assembly is placed S3 into the cutout in the stabilizing assembly, i.e. the backlight, if necessary together with the housing. Finally, the display assembly is in turn optionally adhesively bonded S4 to the stabilization assembly.

The invention claimed is:
1. A display element comprising:
 a display assembly with a display panel and a backlight arranged behind the display panel;
 a stabilization assembly with a cutout for accommodating the display assembly; and
 a decorative film, which is attached at least to a top side of the stabilization assembly and extends over the cutout for the display assembly,
 wherein the stabilization assembly mechanically stabilizes the decorative film, wherein a portion of the decorative film in a display region located above the display assembly is thinner than a portion of the decorative film in a peripheral region extending around the display assembly.

2. The display element as claimed in claim 1, wherein the decorative film is attached to the top side of the stabilization assembly by adhesive bonding, pressing or hot stamping.

3. The display element as claimed in claim 1, wherein a thickness of the decorative film is greater than 200 μm.

4. A display element comprising:
a display assembly with a display panel and a backlight arranged behind the display panel;
a stabilization assembly with a cutout for accommodating the display assembly; and
a decorative film, which is attached at least to a top side of the stabilization assembly and extends over the cutout for the display assembly,
wherein the stabilization assembly mechanically stabilizes the decorative film,
wherein the decorative film consists of two or more sheets, which each extend over the cutout for the display assembly.

5. The display element as claimed in claim 1, wherein the stabilization assembly is applied onto the decorative film by plastic injection molding.

6. The display element as claimed in claim 1, wherein the display assembly is adhesively bonded to the decorative film and/or to the stabilization assembly.

7. The display element as claimed in claim 1,
wherein the display panel has a plurality of light valves configured to regulate passage of light from the backlight through the display panel, and
wherein a distance between each of the plurality of light valves of the display panel and a top side of the decorative film lies in the range from 500 μm to 1000 μm.

8. The display element as claimed in claim 1, wherein the display element has two or more display assemblies and the stabilization assembly has two or more cutouts for accommodating the two or more display assemblies.

9. The display element as claimed in claim 1, wherein only the decorative film is disposed in the region of the cutout and not any supporting components.

10. A method for producing a display element, the method comprising:
applying a decorative film onto a stabilization assembly, wherein the stabilization assembly mechanically stabilizes the decorative film; and
placing at least a part of a display assembly into a cutout in the stabilization assembly,
wherein a portion of the decorative film in a display region located above the display assembly is thinner than a portion of the decorative film in a peripheral region extending around the display assembly.

11. The method as claimed in claim 10, wherein a display panel of the display assembly is applied onto a rear side of the decorative film before the decorative film is applied onto the stabilization assembly.

* * * * *